(12) United States Patent
Jackson

(10) Patent No.: US 10,756,525 B2
(45) Date of Patent: Aug. 25, 2020

(54) WALL PLATE SYSTEM WITH SCREWLESS COVER

(71) Applicant: Jerry Jackson, Winter Garden, FL (US)

(72) Inventor: Jerry Jackson, Winter Garden, FL (US)

(*) Notice: Subject to any disclaimer, the term of this patent is extended or adjusted under 35 U.S.C. 154(b) by 99 days.

(21) Appl. No.: 16/146,137

(22) Filed: Sep. 28, 2018

(65) Prior Publication Data
US 2020/0106250 A1   Apr. 2, 2020

(51) Int. Cl.
*H02G 3/14* (2006.01)

(52) U.S. Cl.
CPC ...................... *H02G 3/14* (2013.01)

(58) Field of Classification Search
CPC    H02G 3/14; H02G 3/18; H02G 3/081; H02G 3/12; H02G 3/088; H02G 3/085; H05K 5/03; H05K 5/02; H05K 5/00
USPC ........... 174/66, 67, 53, 57, 58; 220/241, 242
See application file for complete search history.

(56) References Cited

U.S. PATENT DOCUMENTS

| | | | | |
|---|---|---|---|---|
| 5,041,698 | A * | 8/1991 | Takagi | H02G 3/14 174/66 |
| 5,180,886 | A * | 1/1993 | Dierenbach | H02G 3/14 174/66 |
| 6,616,005 | B1 * | 9/2003 | Pereira | H02G 3/14 174/66 |
| 7,071,414 | B2 | 7/2006 | Kim | |
| 7,323,639 | B1 * | 1/2008 | Shotey | H02G 3/14 174/66 |
| 7,348,486 | B1 | 3/2008 | Shotey et al. | |
| 7,482,537 | B1 * | 1/2009 | Shotey | H02G 3/14 174/66 |
| 7,622,676 | B2 * | 11/2009 | Drane | H02G 3/14 174/66 |
| 7,915,528 | B2 * | 3/2011 | Ni | H02G 3/14 174/50 |
| 7,939,756 | B2 * | 5/2011 | Daniels | H02G 3/14 174/66 |
| 8,314,334 | B1 * | 11/2012 | Cleghorn | H02G 3/14 174/66 |
| 8,816,200 | B1 * | 8/2014 | Baldwin | H02G 3/14 174/66 |
| 9,559,505 | B2 * | 1/2017 | Gage | H02G 3/14 |
| 2009/0126968 | A1 | 5/2009 | Glas | |

* cited by examiner

*Primary Examiner* — Angel R Estrada
(74) *Attorney, Agent, or Firm* — Jason T. Daniel, Esq.; Daniel Law Offices, P.A.

(57) ABSTRACT

A wall plate system with screwless cover includes a baseplate having one or more central apertures, and a shape that is complementary to the front end of an electrical box. The system includes at least one modular insert that is positionable within the central apertures of the baseplate. Each modular insert including a raised front surface and at least one access opening for engaging an operable portion of a wired device that is located within the electrical box. The system also includes a front cover having one or more cover apertures that compressively engage the raised front surface of each modular insert.

15 Claims, 8 Drawing Sheets

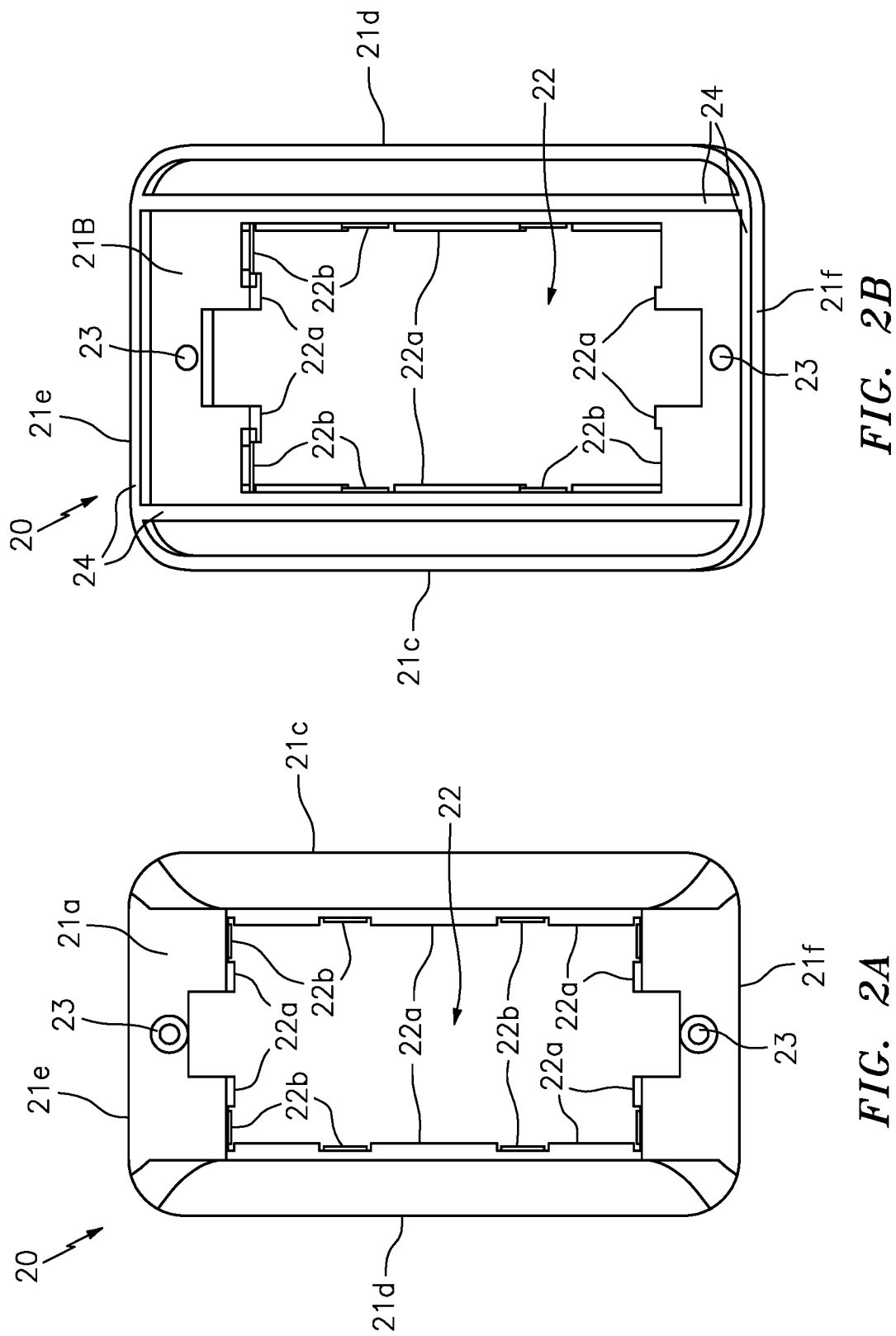

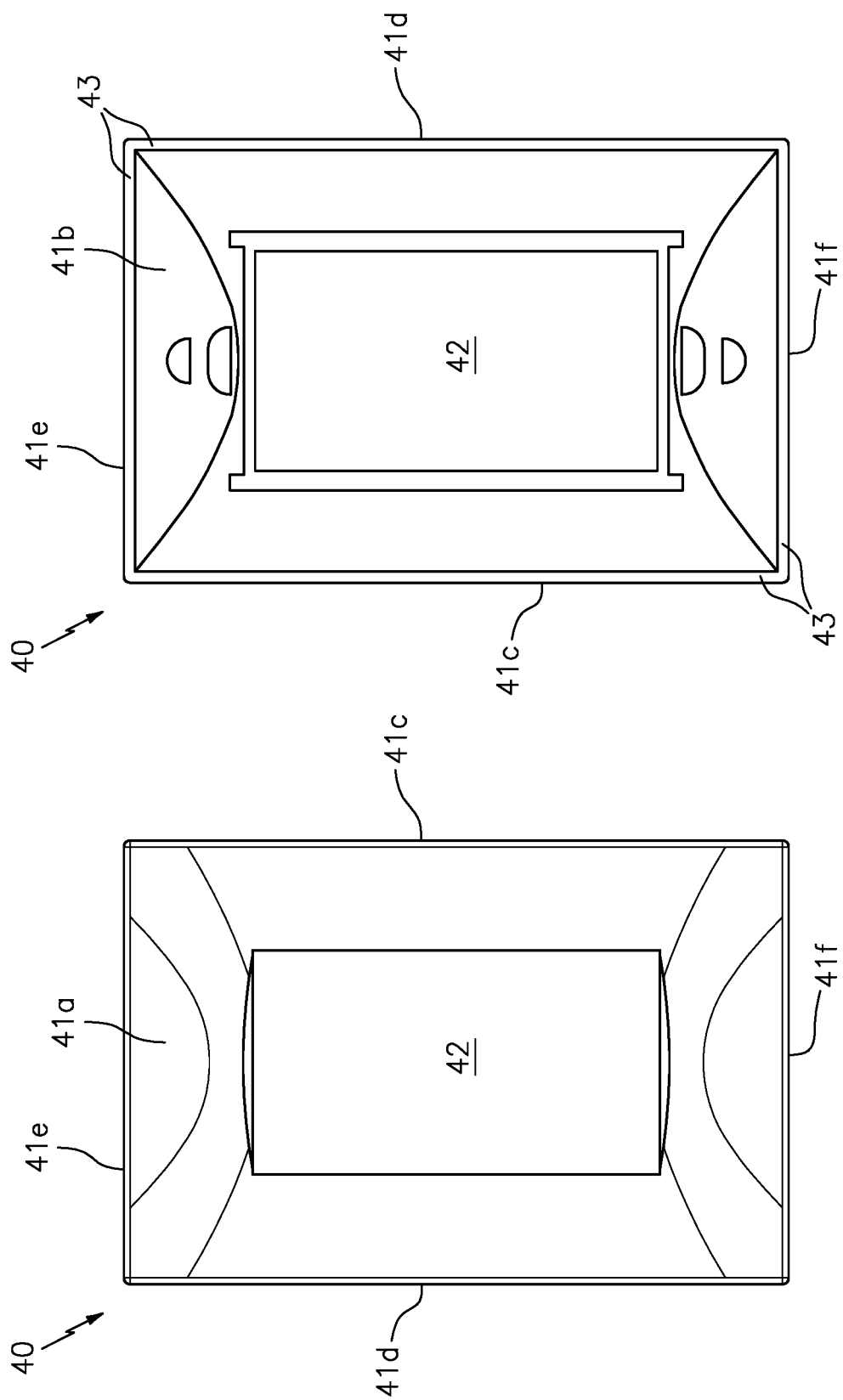

WALL PLATE SYSTEM WITH SCREWLESS COVER

TECHNICAL FIELD

The present invention relates generally to electrical wiring components, and more particularly to a wall mounted enclosure for electrical wiring devices.

BACKGROUND

The statements in this section merely provide background information related to the present disclosure and may not constitute prior art.

Conventional cover plates for wall-mounted electrical wiring boxes, referred to herein as "wall plates," are usually constructed in the form of a plastic or metal plate, having one or more openings that provide limited access to a wired device secured within the electrical box. The primary purpose of the wall plate is to prevent an operator from being exposed to the electrical terminals and wiring within the interior of the electrical box.

Wired devices conforming to the National Electrical Manufacturers Association (NEMA) standards include a metal yoke or mounting strap (collectively, referred to as a "yoke") with oversized mounting holes which permit adjustment of the wired device within the electrical box. The yoke also includes one or more threaded mounting holes for attaching a wall plate by means of screw or screw-type fasteners onto the yoke, thereby completing enclosure of the wired device inside the electrical box. As such, wall plates have been traditionally mounted onto the yoke of a wired device by standard screw fasteners.

While traditional screw-type wall plates offer the operator ready access to the wired device in the electrical box in the event that repair, or replacement of the wired device is necessary, such plates having exposed screws are not aesthetically pleasing to consumers. In response, many industry manufacturers have introduced screwless wall plates that utilize a series of protrusions and indentations which physically clip the wall plate onto a wired device.

Unfortunately, such devices suffer from many drawbacks relating to design and functionality. For example, by relying purely on compression fittings, such devices utilize a plurality of different components to form an assembly before being clipped onto the wired device. When fully assembled, these elements present a bulky appearance and typically include a depth that is approximately 2-3 cm, which is easily twice as deep as a traditional wall plate, thus providing a less aesthetically pleasing look.

Moreover, owing to the larger size and greater mass of such devices, it is not uncommon for these wall plates to fall off and/or to be inadvertently knocked off of the wired device when in use. Such circumstances result in the operator being exposed to the potentially deadly wires that are connected to the wired device. Although some manufacturers have attempted to cure this problem by providing adhesives to reinforce the connection between the wall plate and the wired device, this solution is impractical as it prevents users from accessing the electric box without physically damaging the glued wall plate.

Accordingly, it would be beneficial to provide a wall plate system having a screwless cover that can be adapted for use with any type of wired device and that does not suffer from the drawbacks of the above noted devices.

SUMMARY OF THE INVENTION

The present invention is directed to a wall plate system with screwless cover. One embodiment of the present invention can include a baseplate having one or more central apertures, and a shape that is complementary to the front end of an electrical box. The system can include any number of modular inserts that are positionable within the central apertures. Each of the modular inserts can include a raised front surface and at least one access opening for engaging an operable portion of a wired device that is located within the electrical box or that have no access opening in the case of a blank cover plate.

In one embodiment, the modular insert can be secured to the electrical box by a first pair of screws. In one embodiment, the baseplate can be secured to the wired device by a second pair of screws.

In one embodiment, the system can also include a front cover having an identical number of cover apertures as central apertures. The front cover is designed to be removably secured onto the baseplate whereby the raised front surface of each of the modular inserts are secured within each of the cover apertures in a compressive manner.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

FIG. 2A is a front side view of the baseplate of the system, in accordance with one embodiment of the invention.

FIG. 2B is a back side view of the baseplate of the system, in accordance with one embodiment of the invention.

FIG. 4A is a front side view of the cover of the system, in accordance with one embodiment of the invention.

FIG. 4B is a back side view of the cover of the system, in accordance with one embodiment of the invention.

DETAILED DESCRIPTION OF THE INVENTION

Figure 1:
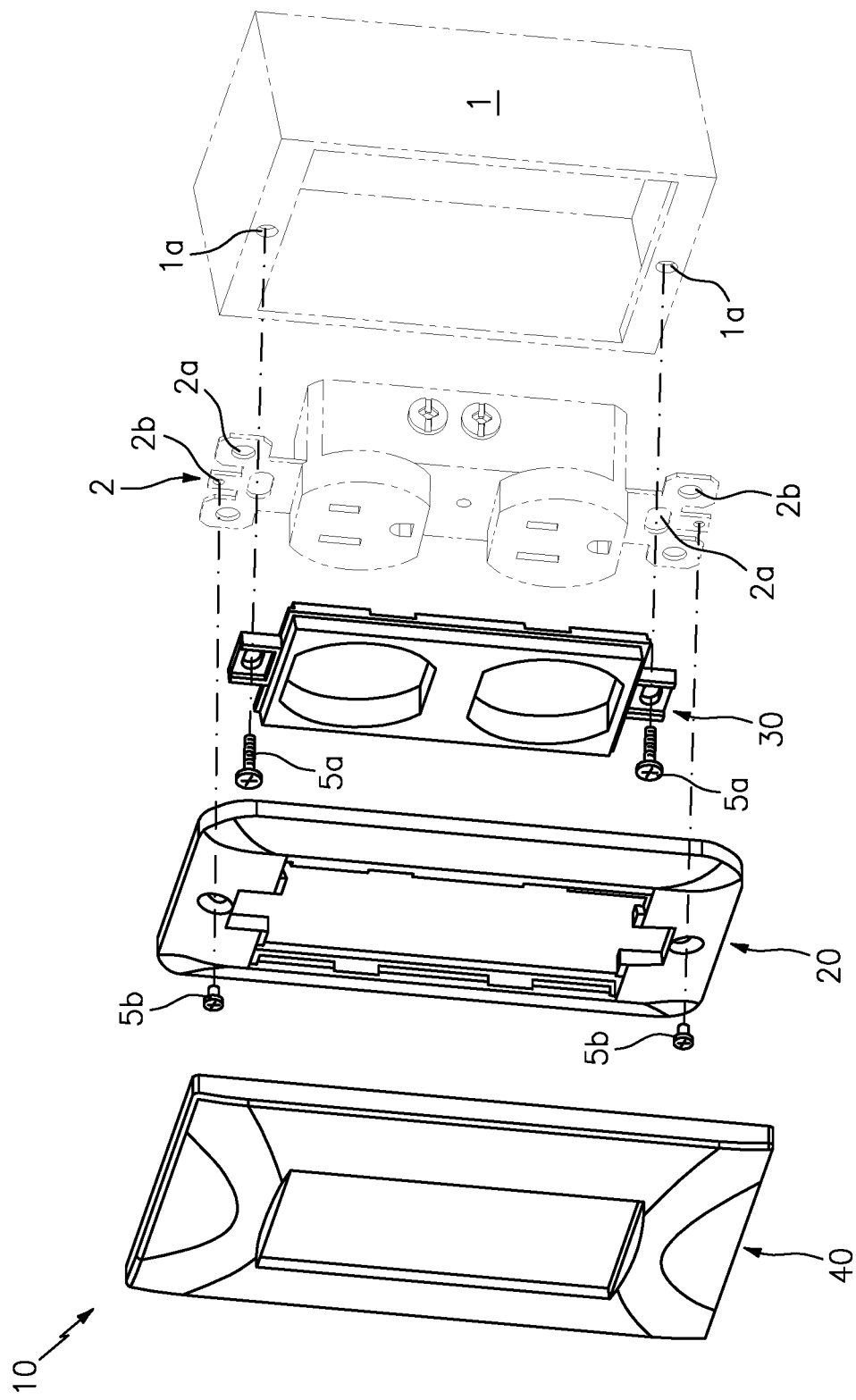
FIG. 1 is an exploded parts view of a wall plate system with screwless cover that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described herein, the terms "wired device" and derivatives thereof refer to any number of electrical power, signal control and/or distribution devices which can be utilized with a wall plate. Several nonlimiting examples include, but are not limited to various switches, electrical outlets, dimmers, actuators, cable connectors, phone jacks, and data ports, for example.

As described herein, the term "removably secured," and derivatives thereof shall be used to describe a situation wherein two or more objects are joined together in a non-permanent manner so as to allow the same objects to be repeatedly joined and separated.

As described herein, the term "complementary shape," and "complementary dimension," shall be used to describe a shape and size of a component that is identical to, or substantially identical to the shape and size of another identified component.

As described herein, the term "compressive manner" and derivatives thereof refer to one example of removably securing items together, whereby two components having complementary shapes and dimensions are secured together so that an outer periphery of one component is in continuous communication with an inner periphery of the other component.

FIGS. 1-6 illustrate various embodiments of a wall plate system with screwless cover 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIG. 1 is an exploded parts view of a wall plate system with screwless cover 10 for use with a single-gang electrical box. As shown, the system 10 can include, essentially, a base plate 20, one or more modular inserts 30, and a screwless front cover 40.

FIGS. 2A and 2B illustrate one embodiment of the baseplate 20 that includes a front surface 21a, a back surface 21b, and a plurality of side walls 21c, 21d, 21e and 21f. In the preferred embodiment, the baseplate will include a shape and size that is complementary to or slightly larger than e.g., 0.5 cm to 1 cm, the front end of a traditional single-gang electrical box 1 and can be constructed from any number of non-electrically conductive materials such as polycarbonate or other types of plastic, for example.

The baseplate can include a central aperture 22 having a series of protrusions and indentations 22a/22b that are disposed along the outside periphery of the aperture. A pair of screw holes 23 can be located directly above and below the central aperture 22 at locations that are complementary to the threaded receivers 2b of a wired device. As shown throughout the drawings, the central aperture 22 can include a generally rectangular-shaped opening that is designed to receive a modular insert 30 containing a wired device 2, and the screw holes 23 and 2b function to receive a screw 5b that secures the baseplate to the wired device.

In various embodiments, the baseplate 20 can also include a raised ledge 24 that extends outward from the back surface 21b. The ledge will preferably include a shape and size that is complementary to the shape and size of the front end of an electrical box 1. Such a feature ensures the baseplate can be secured to the front of the electrical box in a manner that will completely cover all electrical wiring within the box.

Figure 3A:
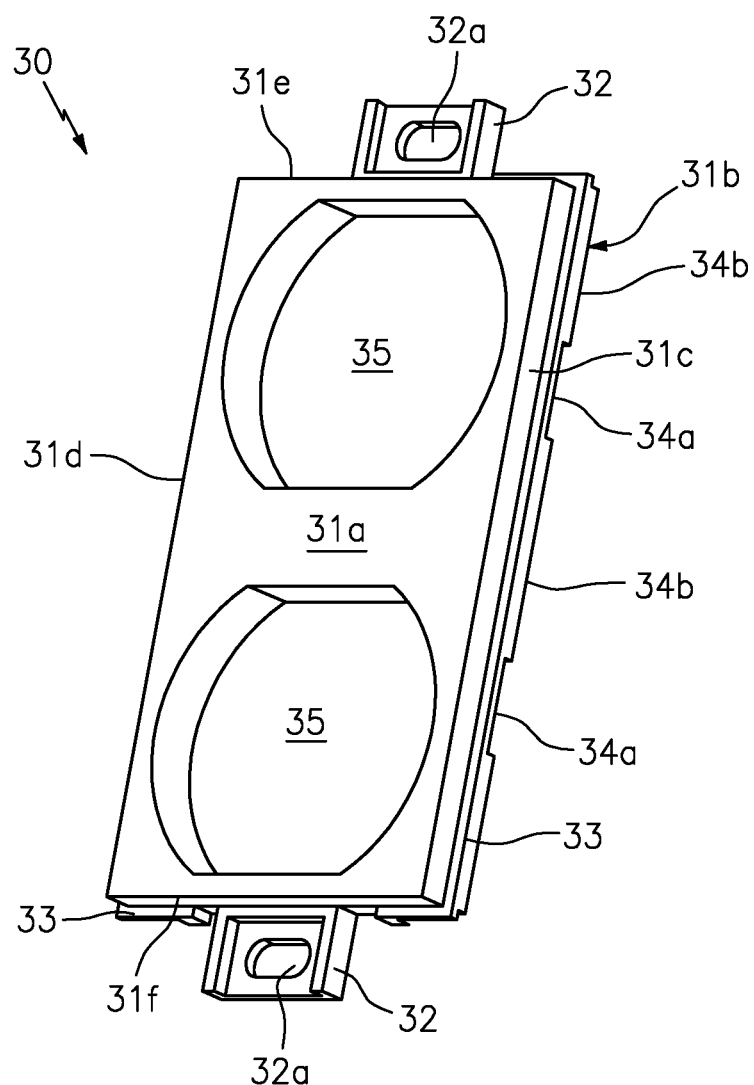
FIG. 3A is a perspective view of a modular insert of the system, in accordance with one embodiment of the invention.

FIG. 3A illustrates one embodiment of a modular insert 30 for use with the system. As shown, the modular insert can include a generally rectangular-shaped main body having a front surface 31a, a back surface 31b and a plurality of side walls 31c, 31d, 31e and 31f. A pair of installation tabs 32 can extend from the top and bottom walls and can each include an elongated installation hole 32a that is positioned so as to align with the installation holes 2a of a wired device 2. In this regard, the modular insert can be secured to the electrical box 1 via a screw 5a that passes through holes 32a and 2a before engaging the threaded receiver 1a on the electrical box.

Each modular insert 30 is designed to be compressively secured within the central aperture 22 of a baseplate and will preferably include a shape and size that is complementary to the shape and size of the central aperture. As shown, the outer perimeter of the modular insert 30 can also include one or more ledges 33 having a series of indentations and protrusions 34a/34b that are complementary in shape, size and location to the protrusions and indentations 22a/22b of the base plate 20, respectively.

Figure 3C:
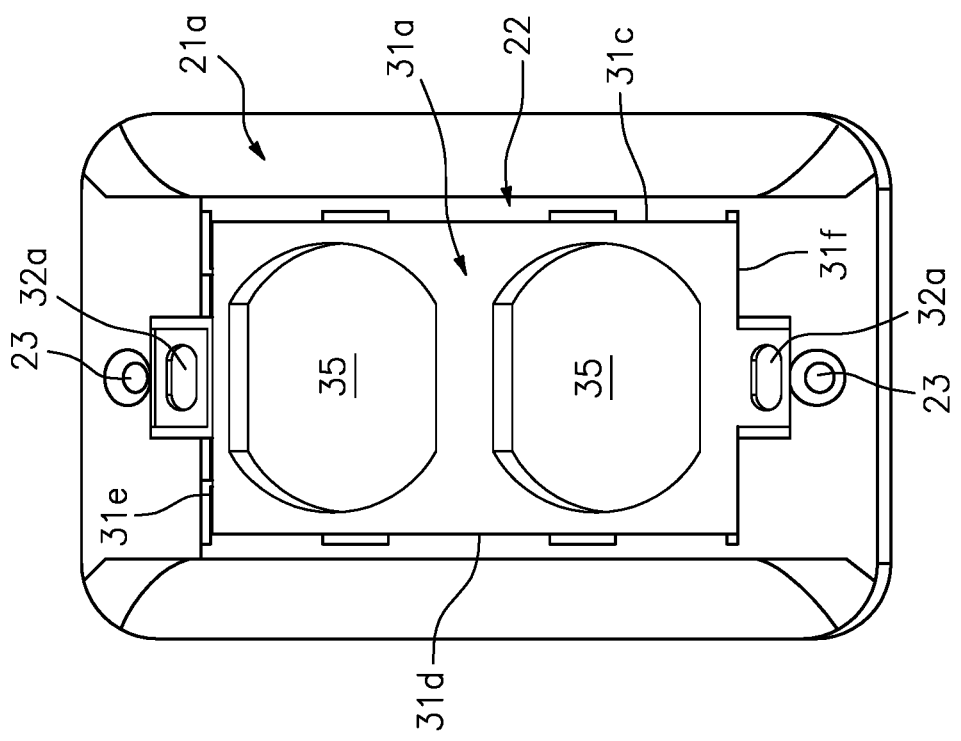
FIG. 3C is a front side view of the baseplate and modular insert of the system, in accordance with one embodiment of the invention.
Figure 3B:
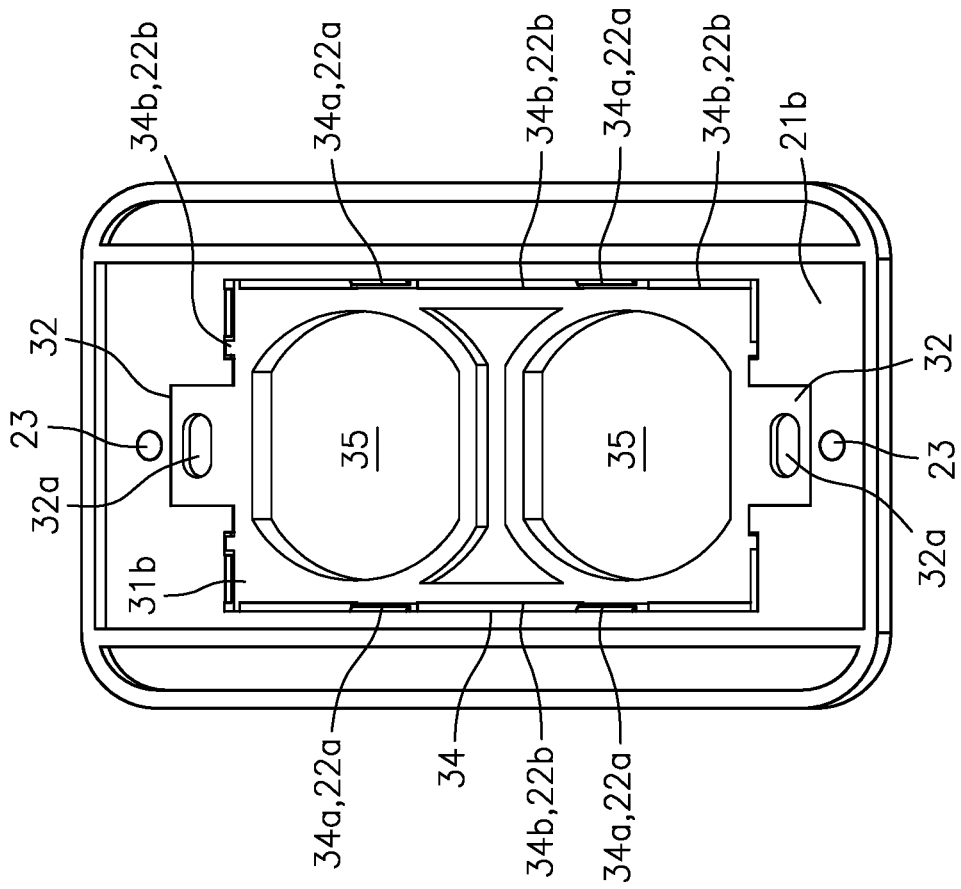
FIG. 3B is a back side view of the baseplate and modular insert of the system, in accordance with one embodiment of the invention.

As shown, best at FIGS. 3B and 3C, the modular insert 30 can be aligned and inserted into the central aperture 22 of the baseplate until the ledge 34 and indentations/protrusions make contact with the back surface 21b. When so positioned, the back surface of the modular insert will be flush with the back surface of the baseplate, and the interlocking protrusions and indentations of the base plate and modular insert will function to securely position the insert 30 within the central aperture of the baseplate. At this time, the front surface 31a will extend outward from the front surface of the baseplate 21a, and each of the side walls 31c-31e can be exposed.

Figure 6:
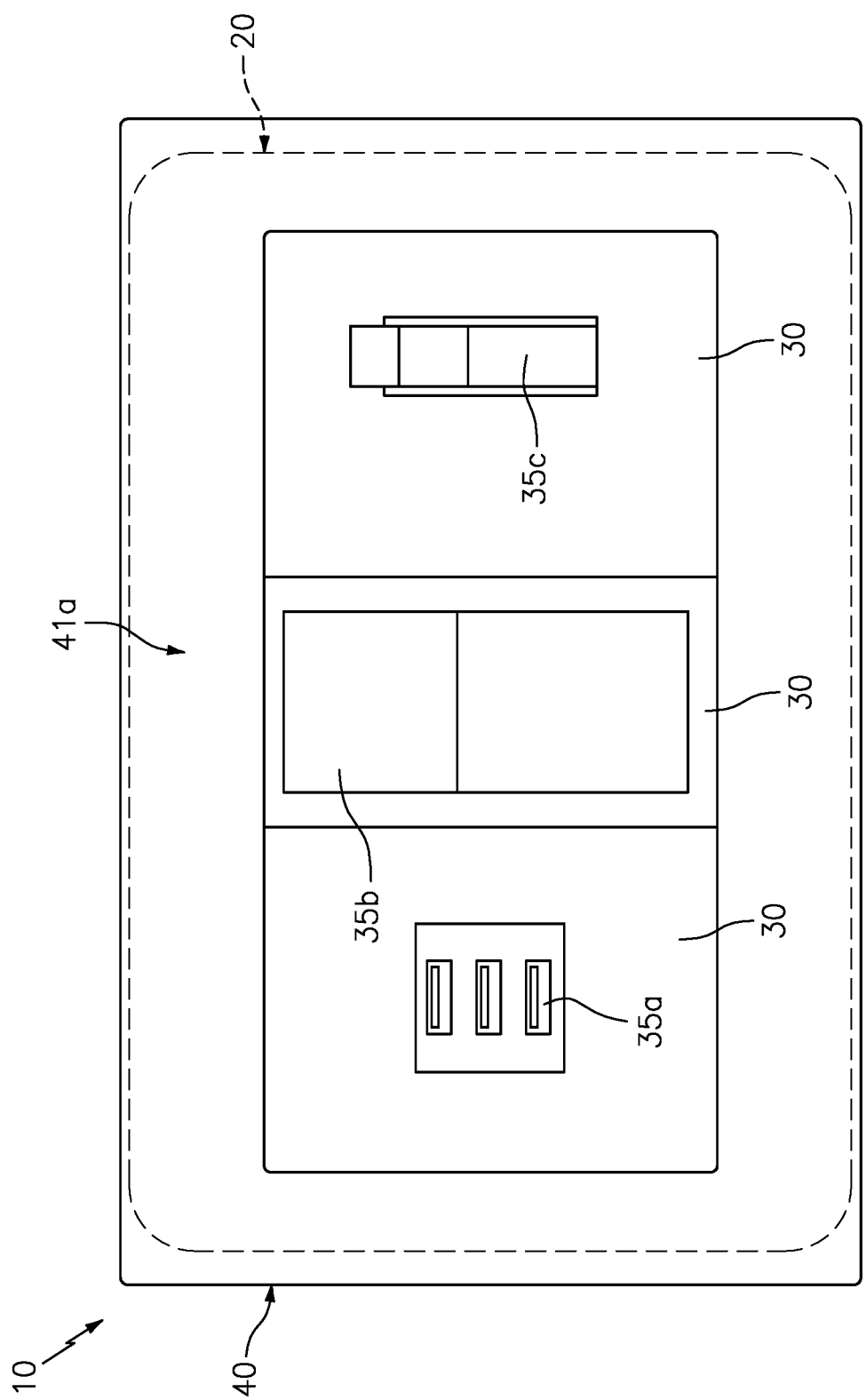
FIG. 6 is a front side view of the system configured for a multi-gang electrical box, in accordance with one embodiment of the invention.

As shown throughout the drawings, each modular insert 30 can also include one or more access openings 35 having a shape and size that is configured to receive the operable portion 2c of a wired device 2. In the illustrated example, the modular insert can include two distinct openings 35 for receiving a duplex electrical outlet. Of course, the system can include multiple inserts 30 each having any number of access openings for engaging any number of other types of wired devices such as a light switch toggle (35c), a decorator light switch rocker/decorator outlet (35b) and/or a data or phone jack (35c), for example, as shown at FIG. 6.

FIGS. 4A and 4B illustrate one embodiment of a single-gang screwless front cover 40 that includes a front surface 41a, a back surface 41b, and a plurality of side walls 41c, 41d, 41e and 41f. The cover can include a centrally located aperture 42 (e.g., cover aperture) and each of the side walls can extending outward from the rear surface. As will be described below, the cover 40 is designed to receive the baseplate 20 and modular insert(s) 30 within the area defined by the side walls and can therefore include a shape and size that is complementary to the shape and size of the baseplate. Additionally, the cover aperture 42 is designed to receive a portion of the modular insert 30 and can therefore include a shape and size that is complementary to the raised front surface 31a of the modular insert. In this regard, the raised sides 31c, 31d, 31e and 31f can be secured within the inside periphery of the cover aperture 42 in a compressive manner so that the raised front surface 31a is flush with the front surface 41a.

Figure 5A:
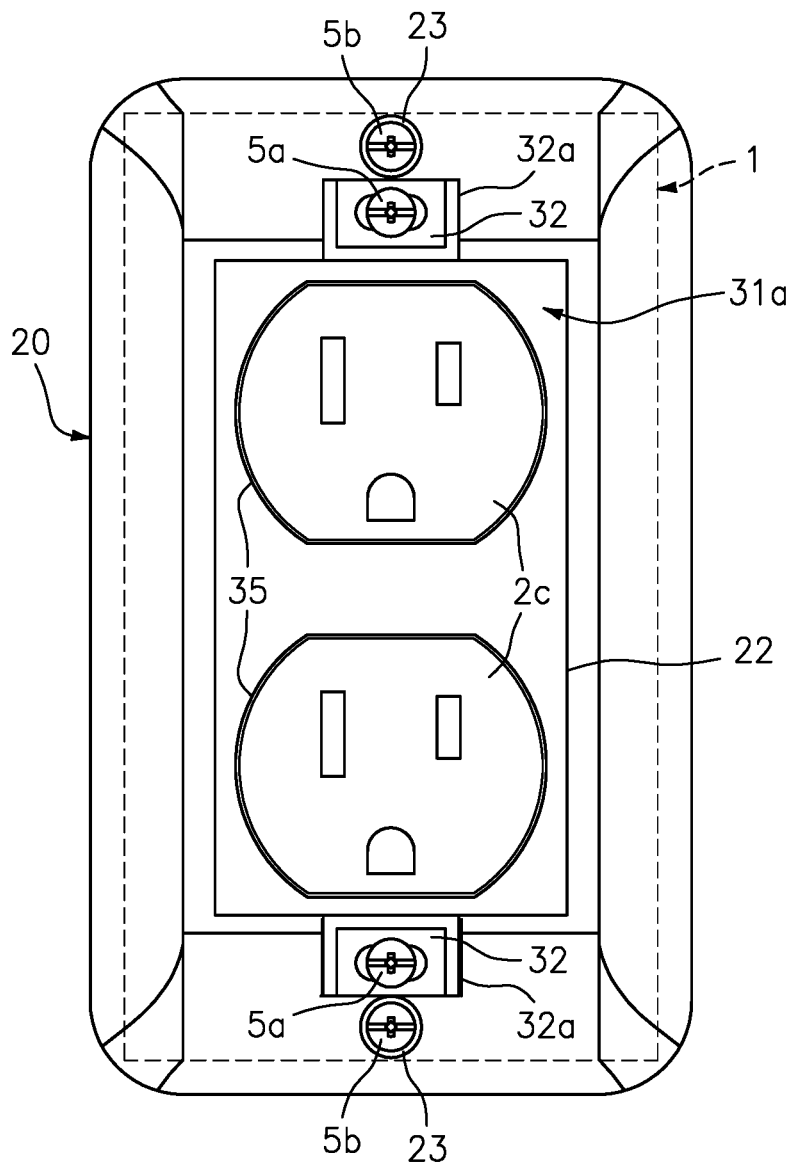
FIG. 5A is a front side view of the system in operation without the cover, in accordance with one embodiment of the invention.
Figure 5B:
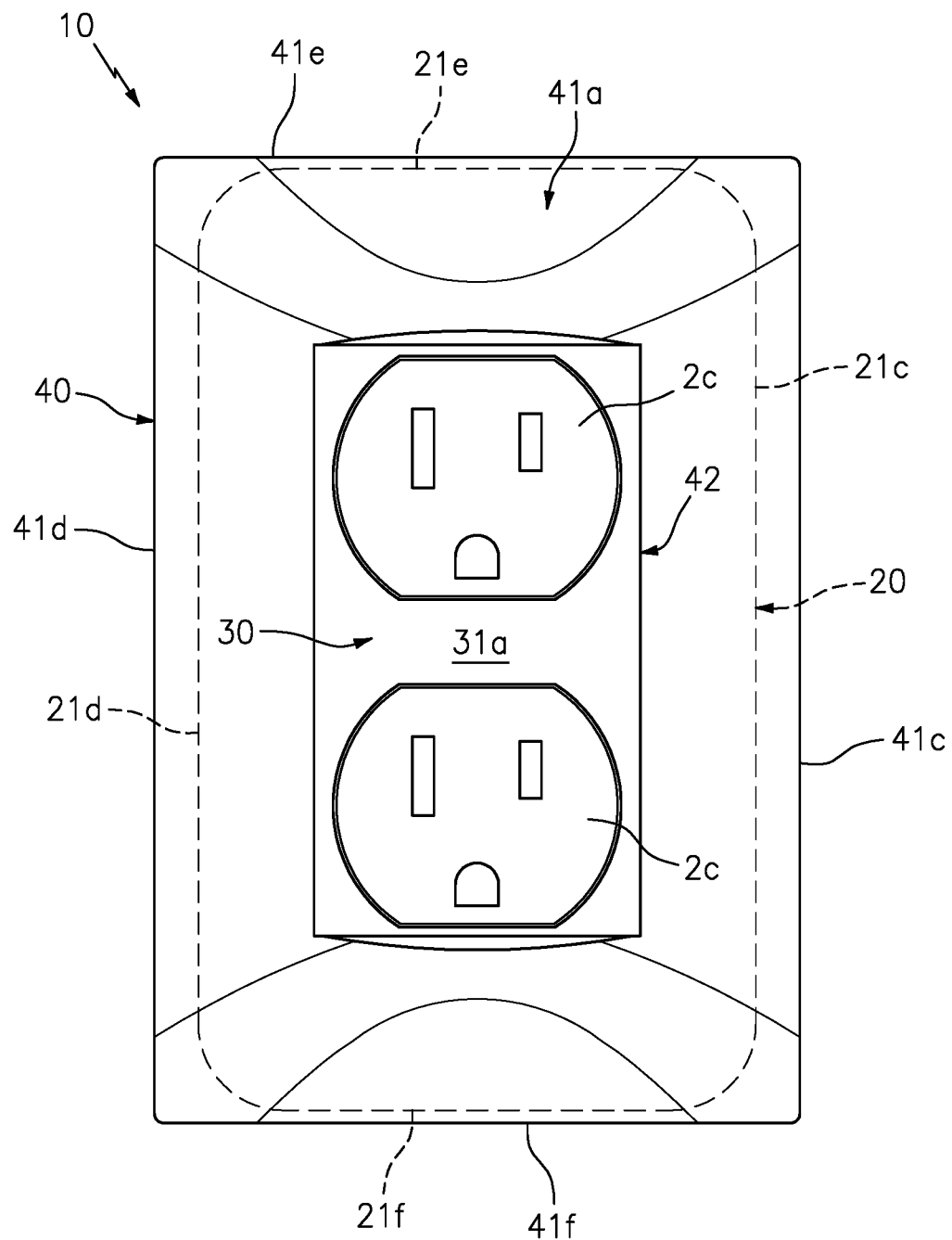
FIG. 5B is a front side view of the system in operation with the cover, in accordance with one embodiment of the invention.

FIGS. 5A and 5B illustrate one embodiment of the system 10 in operation. As shown, the modular insert 30 can be positioned within the central aperture 22 of the baseplate, and a wired device 2 can be aligned with the modular insert so that the operable portion 2c is within the access opening (s) 35. Next, screws 5a can be routed through holes 32a until engaging the threaded receiver of the electrical box 1, and screws 5b can be routed through holes 23 until engaging the threaded receiver 2b of the wired device.

When so positioned, the presence of the baseplate 20 and the insert 30 will completely cover any and all wiring within the electrical box, thereby significantly reducing the risk of an electrical shock, even if the screwless cover 40 is not installed.

Next, the central aperture 42 of the front cover 40 can be aligned with the raised surface of the modular insert 30, and the front cover can be positioned over the baseplate and insert. At this time, the side walls of the modular insert will each be in physical contact with the side walls of the central aperture 42, and the cover 40 will be held in place through this compressive connection. When so positioned, baseplate and modular insert are completely positioned within the depth of the front cover, and none of the screws are visible.

As noted above, one important aspect of the present design is to provide a screwless system having a depth that approximates a traditional screw-type wall plate. Accordingly, by positioning a portion of the modular insert within the baseplate, and then positioning both the baseplate and modular insert behind and within the front cover, respectively, the assembled system is able to achieve this feature. Therefore, in the preferred embodiment, the front cover can include a depth (e.g., distance between the back surface 41b and the distal end of each side wall) of between 0.5 and 1 cm, thus corresponding to the thickness of a traditional screw-type wall plate.

Although illustrated with regard to a single gang system, those of skill in the art will recognize that the inventive concepts described herein can be equally applied to any number of multi-gang systems. For example, FIG. 6 illustrates one embodiment of the system 10 that is configured as a 3-gang system having three modular inserts 30 with different access openings 35a, 35b and 35c, for use with a data jack, decorator switch and toggle light switch, respectively.

In various embodiments, each single or multi-gang system can be provided as a kit containing a baseplate 20, cover 40 and a plurality of modular inserts 30 each containing access openings 35 for engaging the operable portion of any type of wired device.

As described herein, one or more elements of the system 10 can be secured together utilizing any number of known attachments means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:
1. A wall plate system, comprising:
a baseplate having a front surface, a back surface and a shape and size that is complementary to a shape and size of a front end of an electrical box, and
at least one central aperture that is disposed along the baseplate extending from the front surface to the back surface;
at least one modular insert having a raised front surface and at least one access opening that is configured to receive an operable portion of a wired device located within the electrical box, each of the at least one modular inserts including shape and size that is complementary to a shape and size of the at least one central aperture of the baseplate;
a first pair of screw holes that are located along a top and bottom end of each of the at least one modular insert, said first pair of screw holes being configured to receive a first pair of screws for securing the modular insert to the electrical box; and
a front cover having a front surface, a back surface and a shape and size that is complementary to the shape and size of the baseplate,
at least one cover aperture that is disposed along the front cover extending from the front surface to the back surface, each of the at least one cover apertures including a shape and size that is complementary to the raised front surface of the at least one modular insert, wherein the front surface of each of the modular insert is configured to engage the back surface of the baseplate, wherein the front surface of the baseplate is configured to engage the back surface of the front cover, and wherein the raised front surface of each of the at least one modular insert is configured to engage the at least one cover aperture.

2. The wall plate system of claim 1, further comprising:
a second pair of screw holes that are located above and below each of the at least one central aperture of the baseplate, said second pair of screw holes being configured to receive a second pair of screws for securing the baseplate and the modular insert to the wired device located within the electrical box.

3. The wall plate system of claim 1, wherein the raised front surface of each of the at least one modular insert includes a generally rectangular shape, and
wherein each of the at least one modular insert is compressively secured within one of the at least one cover apertures.

4. The wall plate system of claim 1, further comprising:
a series of interlocking protrusions and indentations that are secured along an inside perimeter of each of the at least one central aperture, and an outside perimeter of each of the at least one modular insert.

5. The wall plate system of claim 1, wherein each of the at least one access opening includes a shape and size that is configured to engage a duplex electrical outlet, a light switch toggle, a decorator light switch rocker, a decorator electrical outlet, or a data jack.

6. The wall plate system of claim 1, wherein the at least one modular insert comprises:
a plurality of modular inserts, each having at least one access opening that is configured to receive an operable portion of the wired device.

7. The wall plate system of claim 6, wherein each of the plurality of modular inserts includes a different shaped access opening.

8. The wall plate system of claim 1, wherein the at least one central aperture comprises a single aperture, and the shape and size of the baseplate conforms to a single gang electrical box.

9. The wall plate system of claim 8, wherein the at least one modular insert comprises:
a plurality of modular inserts, each having at least one access opening that is configured to receive an operable portion of the wired device.

10. The wall plate system of claim 9, wherein each of the plurality of modular inserts includes a different shaped access opening.

11. The wall plate system of claim 1, wherein the at least one central aperture comprises a plurality of central apertures, and the shape and size of the baseplate conforms to a multi-gang electrical box.

12. The wall plate system of claim 11, wherein the at least one cover aperture comprises an identical number of cover apertures as the plurality of central apertures.

13. The wall plate system of claim 12, wherein the at least one modular insert comprises:
a plurality of modular inserts, each having at least one access opening that is configured to receive an operable portion of the wired device.

14. The wall plate system of claim 13, wherein each of the plurality of modular inserts includes a different shaped access opening.

15. The wall plate system of claim 1, wherein each of the baseplate and the at least one modular inserts are constructed from a non-electrically conductive material.

* * * * *